(12) United States Patent
Vacher et al.

(10) Patent No.: US 8,072,377 B2
(45) Date of Patent: Dec. 6, 2011

(54) METHOD OF MANAGING ADDITIONAL FILTERS IN A SATELLITE NAVIGAITON SYSTEM

(75) Inventors: Charlie Vacher, Paris (FR); Jean-Claude Goudon, Montelier (FR)

(73) Assignee: Sagem Defense Securite, Paris (FR)

( * ) Notice: Subject to any disclaimer, the term of this patent is extended or adjusted under 35 U.S.C. 154(b) by 327 days.

(21) Appl. No.: 12/294,839

(22) PCT Filed: Mar. 16, 2007

(86) PCT No.: PCT/FR2007/000456
§ 371 (c)(1),
(2), (4) Date: Sep. 26, 2008

(87) PCT Pub. No.: WO2007/110496
PCT Pub. Date: Oct. 4, 2007

(65) Prior Publication Data
US 2010/0141521 A1    Jun. 10, 2010

(30) Foreign Application Priority Data

Mar. 27, 2006 (FR) ...................................... 06 02631

(51) Int. Cl.
*G01S 19/28* (2010.01)
*G01S 19/25* (2010.01)

(52) U.S. Cl. ............................. 342/357.67; 342/357.64
(58) Field of Classification Search ............ 342/357.02, 342/357.06, 357.12, 357.15, 357.21, 357.34, 342/357.42, 357.64, 357.67; 701/207, 213
See application file for complete search history.

(56) References Cited

U.S. PATENT DOCUMENTS

| 5,760,737 A | 6/1998 | Brenner |
| 2003/0117317 A1 | 6/2003 | Vanderwerf |

FOREIGN PATENT DOCUMENTS

| FR | 2866423 | 8/2005 |

*Primary Examiner* — Dao L Phan
(74) *Attorney, Agent, or Firm* — Muncy, Geissler, Olds & Lowe, PLLC

(57) ABSTRACT

A method of managing additional filters in a navigation system fitted to a vehicle, the system acting, during a journey of the vehicle, to deliver at least one position of the vehicle by using a main filter for merging data coming from a constellation of visible satellites present above a vehicle horizon, each additional filter excluding data coming from one of the satellites in order to obtain a corrected position in the event of failure of the excluded satellite. The steps including from a position of the vehicle, determining a theoretical constellation of satellites present above the horizon; and for each satellite present in the theoretical constellation, creating and maintaining an additional filter excluding that satellite.

5 Claims, 2 Drawing Sheets

METHOD OF MANAGING ADDITIONAL FILTERS IN A SATELLITE NAVIGAITON SYSTEM

The present invention relates to a method of managing additional filters in a satellite navigation and positioning system such as a global positioning system (GPS), the system being fitted to a vehicle, and in particular to an aircraft.

BACKGROUND OF THE INVENTION

During a flight of the aircraft, such a navigation system serves to calculate successive positions of the aircraft by making use of a main filter for merging data coming from a constellation of visible satellites that are present above a horizon of the aircraft, and possibly also data coming from an inertial navigation unit or the like on board the aircraft. It is recalled that the horizon is the line separating that which is masked from the aircraft by the curvature of the earth from that which is not masked thereby. With the GPS system, some maximum number of satellites can be present above the horizon of an aircraft (i.e. there will be some maximum number of satellites that are not masked from the aircraft by the curvature of the earth), and this number is about ten. However, it is not unusual for geographical relief or a portion of the aircraft to mask one or more of the satellites. Nevertheless, the navigation system remains operational providing it has data available from at least four satellites making up the constellation of visible satellites. The navigation system is found to be particularly accurate when the satellites are operating correctly, however its performance falls off quickly as soon as one of the satellites presents a failure that affects the validity of the data it transmits.

To remedy that problem, the navigation system also calculates corrected positions from additional filters, each of which excludes data coming from one of the satellites. When failure of one of the satellites is detected, the additional filter that excludes that particular satellite becomes the main filter, and the other additional filters are initialized from the new main filter.

The creation of additional filters is triggered by detecting a new satellite. Thus, as soon as the data coming from a satellite reaches the navigation system, an additional filter excluding that satellite is created and the satellite is incorporated in the existing additional filters. When the navigation system no longer detects data coming from that satellite, the corresponding additional filter is deleted. Unfortunately, when satellites are masked by geographical relief or by a portion of the aircraft, the data transmitted by the masked satellites no longer reach the navigation system, thereby causing the corresponding filters to be deleted, which filters will be recreated when the satellites are no longer masked and data from them again reaches the navigation system. Managing additional filters is particularly burdensome and constitutes a major computation load for the navigation system.

OBJECT OF THE INVENTION

It would therefore be advantageous to have means available for lightening the load of managing additional filters.

SUMMARY OF THE INVENTION

To this end, the invention provides a method of managing additional filters in a navigation system fitted to a vehicle, the system acting, during a journey of the vehicle, to deliver at least one position for the vehicle by using a main filter for merging data coming from a constellation of visible satellites present above a vehicle horizon, each additional filter excluding data coming from one of the satellites in order to obtain a corrected position in the event of failure of the excluded satellite. The method comprises the steps of:

from a position of the vehicle, determining a theoretical constellation of satellites present above the horizon; and
for each satellite present in the theoretical constellation, creating and maintaining an additional filter excluding that satellite.

Thus, the additional filters are maintained so long as the satellites they exclude remain present in the theoretical constellation, regardless of whether the satellites are visible or masked. Since the theoretical constellation suffers relatively few modifications during the journey of the vehicle, there are relatively few creations and deletions of additional filters.

Preferably, for each satellite present in the theoretical constellation, the method includes the step of including said satellites in the existing additional filters as soon as said satellite appears in the theoretical constellation.

Thus, a satellite appearing in the theoretical constellation is incorporated in the existing additional filters without waiting for that satellite to be detected by the main filter. This incorporation can thus be performed while distributing computation load.

Advantageously, the position used for determining the theoretical constellation is provided by the main filter.

The theoretical constellation as determined then corresponds precisely to the position of the vehicle during its journey, even if the destination or the passing points of the vehicle happen to be changed during the journey.

Also preferably, when a satellite disappears from the theoretical constellation at some instant on a journey, the method comprises the step of waiting for a predetermined duration before eliminating the additional filter excluding said satellite.

This is most advantageous in the event of a satellite disappearing temporarily from the theoretical constellation.

Advantageously, when a satellite that has disappeared reappears in the theoretical constellation, the method includes the step of waiting for the filters to converge prior to creating an additional filter excluding said satellite and reincorporating said satellite in the existing additional filters.

This makes it possible to avoid that a satellite suffering from an undetected failure at the time it disappears from the constellation being reincorporated in the additional filters and then causing the corrected positions to be erroneous.

Other characteristics and advantages of the invention appear on reading the following description of a particular non-limiting implementation of the invention.

BRIEF DESCRIPTION OF THE DRAWINGS

Reference is made to the accompanying drawings, in which.

DETAILED DESCRIPTION OF THE INVENTION

Figure 1:
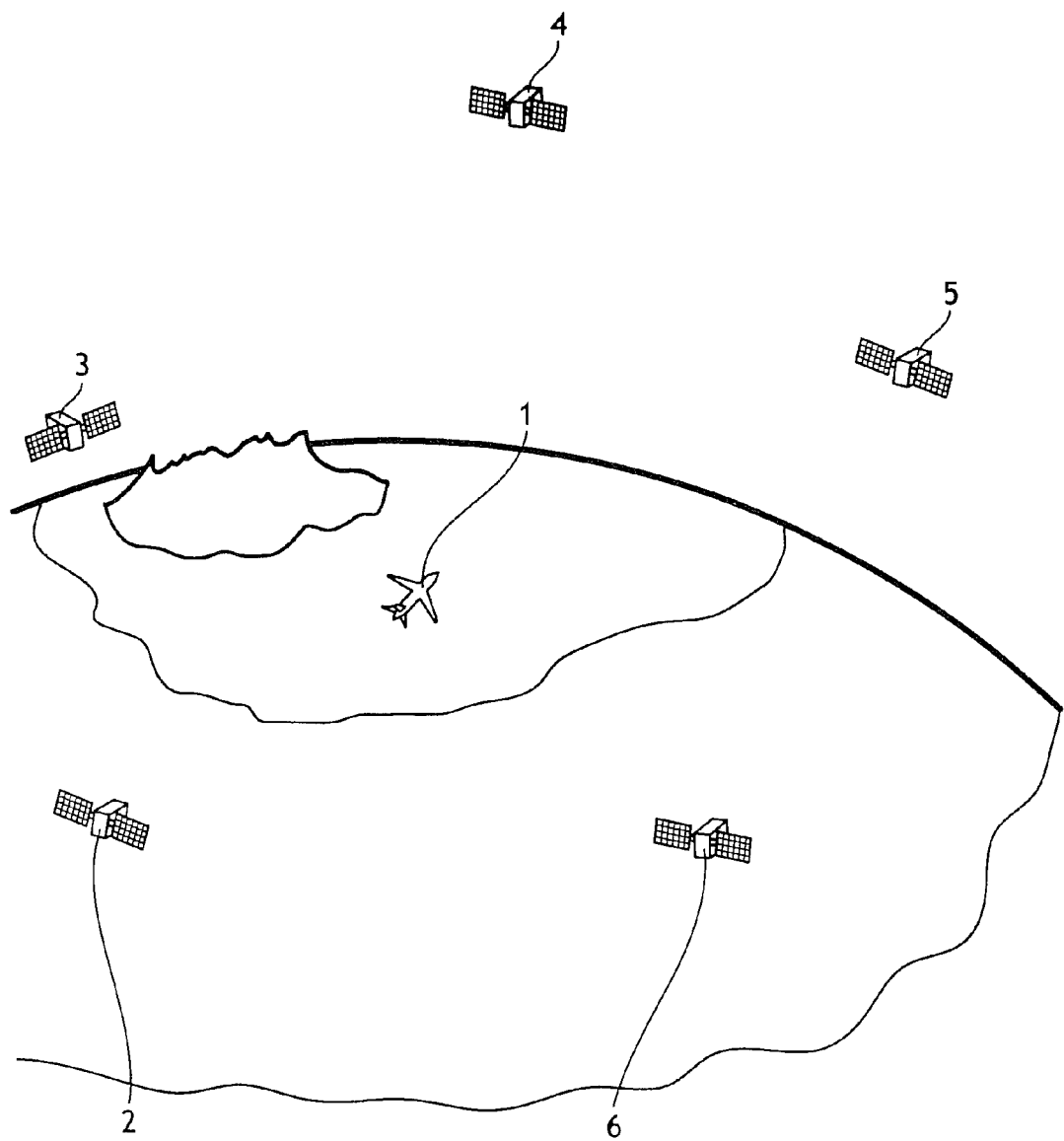
FIG. 1 is a diagrammatic perspective view of a constellation of satellites present above the horizon of an aircraft.
Figure 2:
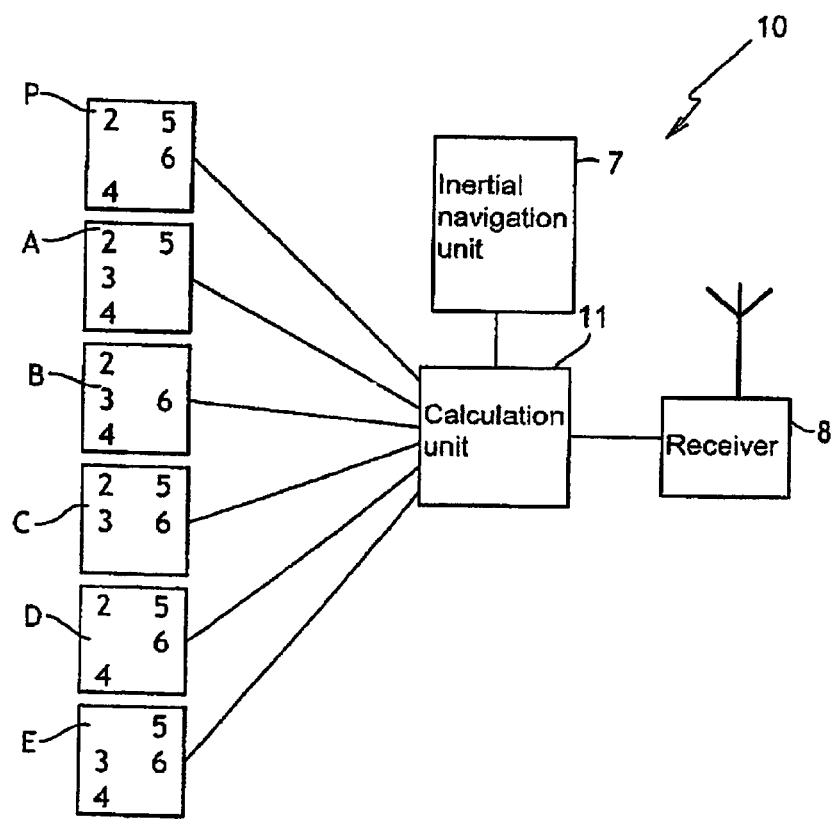
FIG. 2 is a diagrammatic view of a navigation system on board the aircraft.

With reference to the figures, the method of the invention is described below with reference to an aircraft 1 having an on-board navigation system 10 making use of data coming from satellites 2, 3, 4, 5, and 6 that are in orbit around the earth 100, and of data coming from an inertial navigation unit 7 on board the aircraft 1.

The inertial navigation unit 7 is itself known and responds to sensors mounted in the aircraft 1 to deliver data relating in particular to the attitude of the aircraft 1, its speed, or other parameters.

The satellites 2, 3, 4, 5, 6 form part of a set of satellites that are positioned in geostationary orbit around the earth and that belong to a satellite positioning system of the GPS type. Each satellite 2, 3, 4, 5, 6 continuously transmits a signal that includes its position and the exact time the signal was transmitted. Naturally, the invention is equally unusable with other satellite positioning systems, such as the Galileo system when it becomes operational.

The navigation system 10 includes a calculation unit 11 connected to the inertial navigation system 7 and to a receiver 8 for receiving signals coming from the satellites. In known manner, the calculation unit 11 incorporates processors and memories enabling it to calculate a pseudo-range between the aircraft 1 and each of the satellites from which a signal has been detected by the receiver 8, and for merging these pseudo-ranges together with data coming from the inertial navigation unit 7 in order to, amongst other things determine a position for the aircraft 1.

Merging is performed in known manner by making use of a main filter P that takes account of the data from the satellites that are present above the horizon of the aircraft 1 and that are visible in the sense that the signals they are transmitting can be detected by the receiver 8. In this example, these satellites 2, 4, 5, 6 that form the visible satellite constellation, with satellite 3 being masked in this example by a mountain.

The calculation unit 11 also makes use of additional filters A, B, C, D, and E, each of which excludes one satellite in order to obtain a corrected position when the excluded satellite has been identified as being faulty. The additional filter excluding that satellite then takes the place of the main filter and the other additional filters are reinitialized from the new main filter.

Filter management is provided by the calculation unit 11 which incorporates a computer program for filter management, and which is described below.

The main filter P incorporates the satellites progressively as the receiver 8 receives data coming therefrom. The main filter P here incorporates the satellites 2, 4, 5, and 6. If one of these satellites subsequently becomes masked, the satellite is merely considered as being unavailable, but it is not erased from the main filter P.

In order to create the additional filters A, B, C, D, and E, the calculation unit 11 determines a theoretical constellation of satellites present above the horizon of the aircraft on the basis of the position of the aircraft as provided by the main filter. This calculation is relatively easy in itself, given that the positions of the satellites are known.

By way of example, it is assumed that a first determination of the theoretical constellation reveals that the satellites 2, 4, 5, and 6 are above the horizon. The calculation unit creates four additional filters A, B, C, and D, each excluding a respective one of the satellites 2, 4, 5, and 6. The additional filter A incorporates the satellites 2, 4, 5; the additional filter B incorporates the satellites 2, 4, 6; the additional filter C incorporates the satellites 2, 5, 6; and the additional filter C incorporates the satellites 4, 5, 6. Each additional filter thus takes account of data coming from all of the satellites except one.

A subsequent determination of the theoretical constellation reveals that the satellite 3, although still masked for the aircraft 1, nevertheless appears above the horizon. The calculation unit 11 then creates an additional filter excluding the satellite 3 and thus incorporating the satellites 2, 4, 5, and 6, and it updates the additional filters A, B, C, and D by incorporating the satellite 3 therein. The additional filter A then incorporates the satellites 2, 3, 4, 5; the additional filter B then incorporates the satellites 2, 3, 4, 6; the additional filter C then incorporates the satellites 2, 3, 5, 6; and the additional filter D then incorporates the satellites 3, 4, 5, 6. So long as the satellite 3 is masked, the main filter P incorporates only the satellites 2, 4, 5, 6.

When a satellite disappears from the theoretical constellation at some instant in a journey, the method includes a step of waiting for a predetermined duration before eliminating the additional filter that excludes that satellite. The satellite is not erased from the additional filters. At the end of this waiting period, the memory space occupied by that satellite in the additional filters is released. This avoids it being necessary to recreate an additional filter if the disappearance of the satellite is only temporary.

Once the waiting period has terminated, when a satellite that has disappeared reappears in the theoretical constellation, the method includes the step of waiting for the filters to converge before creating an additional filter that excludes this satellite and reincorporating the satellite in the existing additional filters.

Naturally, the invention is not limited to the embodiment that covers any variant coming within the ambit of the invention as defined by the claims.

In particular, a new satellite can be included in the existing additional filters when the satellite is detected by the receiver 8. Nevertheless, this requires a greater computational load than in the implementation described.

In addition, the theoretical constellation can be determined in advance for passing points of the vehicle during its journey if its journey is known in advance and if it is certain that the vehicle has indeed followed the intended journey path.

The waiting times mentioned in the implementation described are optional.

What is claimed is:

1. A method of managing additional filters in a navigation system fitted to a vehicle, the system acting, during a journey of the vehicle, to deliver at least one position of the vehicle by using a main filter for merging data coming from a constellation of visible satellites present above a vehicle horizon, each additional filter excluding data coming from one of the satellites in order to obtain a corrected position in the event of failure of the excluded satellite, the method being comprising the steps of:
   from a position of the vehicle, determining a theoretical constellation of satellites present above the horizon; and
   for each satellite present in the theoretical constellation, creating and maintaining an additional filter excluding the satellite.

2. A method according to claim 1, including the step, for each satellite present in the theoretical constellation, of including said satellites in the existing additional filters as soon as said satellite appears in the theoretical constellation.

3. A method according to claim 1, in which the position used for determining the theoretical constellation is provided by the main filter.

4. A method according to claim 1, in which, when a satellite disappears from the theoretical constellation at some instant on a journey, the method comprises the step of waiting for a predetermined duration before eliminating the additional filter excluding said satellite.

5. A method according to claim 4, in which, when a satellite that has disappeared reappears in the theoretical constellation, the method includes the step of waiting for the filters to converge prior to creating an additional filter excluding said satellite and reincorporating said satellite in the existing additional filters.

* * * * *